United States Patent
Shi et al.

(10) Patent No.: US 11,190,262 B2
(45) Date of Patent: Nov. 30, 2021

(54) WIRELESS COMMUNICATION METHOD AND TERMINAL FOR DETERMINING A LINK QUALITY FOR IMPROVING COVERAGE AND SPECTRAL EFFICIENCY

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 49 days.

(21) Appl. No.: 16/734,186

(22) Filed: Jan. 3, 2020

(65) Prior Publication Data
US 2020/0145086 A1     May 7, 2020

Related U.S. Application Data

(63) Continuation of application No. PCT/CN2018/086188, filed on May 9, 2018.

(51) Int. Cl.
*H04B 7/06* (2006.01)
*H04W 72/04* (2009.01)
(Continued)

(52) U.S. Cl.
CPC ......... *H04B 7/0695* (2013.01); *H04B 7/0617* (2013.01); *H04W 72/046* (2013.01); *H04W 72/08* (2013.01); *H04W 88/023* (2013.01)

(58) Field of Classification Search
CPC .. H04B 7/0695; H04B 7/0617; H04B 7/0408; H04B 7/043; H04B 7/06; H04B 7/08;
(Continued)

(56) References Cited

U.S. PATENT DOCUMENTS

2018/0097556 A1    4/2018   Nagaraja et al.
2019/0075014 A1*   3/2019   Zhou .................. H04W 72/042
(Continued)

FOREIGN PATENT DOCUMENTS

CN     104734809 A    6/2015
CN     104812079 A    7/2015
(Continued)

OTHER PUBLICATIONS

Samsung. 3GPP TSG RAN WG1 Meeting 90bis R1-1717606; Beam failure recovery, Prague, Czech Oct. 9-13, 2017.
(Continued)

*Primary Examiner* — Mewale A Ambaye
(74) *Attorney, Agent, or Firm* — Ladas & Parry, LLP

(57) ABSTRACT

Embodiments of the present disclosure provide a wireless communication method and terminal, and provide message processing methods in the process of non-link reconfiguration, which include: the terminal sends a first message to a network device when determining that link quality is poor enough to satisfy a first condition, the first message being used to indicate a first signal whose signal quality is good enough to satisfy a second condition; detects a second message in a first search space of a control resources set according to a first quasi-co-location QCL hypothesis determined based on the first signal, the second message being a response message sent by the network device for the first message; and stops detecting message from a network side in a second search space of the control resource set from a first moment; wherein the first moment is a moment when the first message is sent or thereafter.

14 Claims, 5 Drawing Sheets

(51) Int. Cl.
*H04W 72/08* (2009.01)
*H04W 88/02* (2009.01)

(58) Field of Classification Search
CPC .. H04B 7/088; H04W 72/046; H04W 88/023; H04W 76/19; H04W 76/25; H04W 74/00; H04W 16/28; H04W 88/00; H04W 88/184
See application file for complete search history.

(56) References Cited

U.S. PATENT DOCUMENTS

| | | | | |
|---|---|---|---|---|
| 2019/0253308 | A1* | 8/2019 | Huang | H04B 7/0695 |
| 2019/0305830 | A1* | 10/2019 | Zhou | H04W 74/0833 |
| 2020/0053613 | A1* | 2/2020 | Cirik | H04L 27/261 |
| 2020/0350972 | A1* | 11/2020 | Yi | H04L 5/0051 |
| 2020/0351129 | A1* | 11/2020 | Kwak | H04B 7/0695 |
| 2020/0351841 | A1* | 11/2020 | Cirik | H04L 5/0048 |

FOREIGN PATENT DOCUMENTS

| | | |
|---|---|---|
| CN | 107079459 A | 8/2017 |
| CN | 107342801 A | 11/2017 |
| CN | 107612602 A | 1/2018 |
| WO | 2019213873 A1 | 11/2019 |
| XN | 107888266 A | 4/2018 |

OTHER PUBLICATIONS

MediaTek Inc. 3GPP TSG RAN WG1 Meeting #90bis R1-1718334; Design Details on Beam Failure Recovery,Prague, Czechia, Oct. 9-13, 2017.

Ericsson. 3GPP TSG RAN WG1 Meeting 90bis R1-1718434; Basic beam recovery, Prague, CZ, Oct. 9-13, 2017.

The third Office Action of corresponding Chinese application No. 201880003242.2, dated Sep. 8, 2020, with search report.

International Search Report in the international application No. PCT/CN2018/086188, dated Feb. 2, 2019.

The first Office Action of corresponding European application No. 18918117.5, dated Jan. 14, 2021.

The First Office Action of corresponding Chinese application No. 201880003242.2, dated Feb. 6, 2020, with search report.

The Second Office Action of corresponding Chinese application No. 201880003242.2, dated May 27, 2020, with search report.

ASUSTeK, 3GPP TSG RAN WG1 Meeting #92 R1-1802071, Remaining Issues for Beam Failure Recovery Procedure, published on Mar. 2, 2018.

Huawei et al. 3GPP TSG RAN WG1 Meeting #92bis R1-1803637, Summary of remaining issues on beam failure recovery, published on Apr. 20, 2018.

Mediatek Inc et al. 3GPP TSG RAN WG1 Meeting #92bis R1-1805730, Summary 3 on Remaing issues on Beam Failure Recovery, published on Apr. 20, 2018.

The EESR of corresponding European application No. 18918117.5, dated May 28, 2020.

VIVO: "Remaining issues on mechanism to recover from beam failure", 3GPP Draft; R1-1803818_Remaining Issues on Mechanism to Recover From Beam Failure, 3rd Generation Partnership Project (3GPP), Mobile Compeience Centre; 650, Route Des Lucioles; F-06921 Sophia-Antipolis, vol. RAN WG1, No. Sanya, China; Apr. 16, 2018-Apr. 20, 2018 Apr. 15, 2018(Apr. 15, 2018), XP051426113.

ZTE et al.:"Remaining details on beam recovery", 3GPP Draft; R1-1801582 Remaining Details on Beam Recovery, 3rd Generation Partnership Project (3GPP), Mobile Competence Centre; 650, Route Des Lucioles; F-06921 Sophia-Antipolis, Cedex; France, vol. RAN WG1, No. Athens, Greece; Feb. 26, 2018-Mar. 2, 2018 Feb. 16, 2018(Feb. 16, 2018), XP051396950.

The second Office Action of corresponding European application No. 18918117.5, dated Jul. 22, 2021.

* cited by examiner

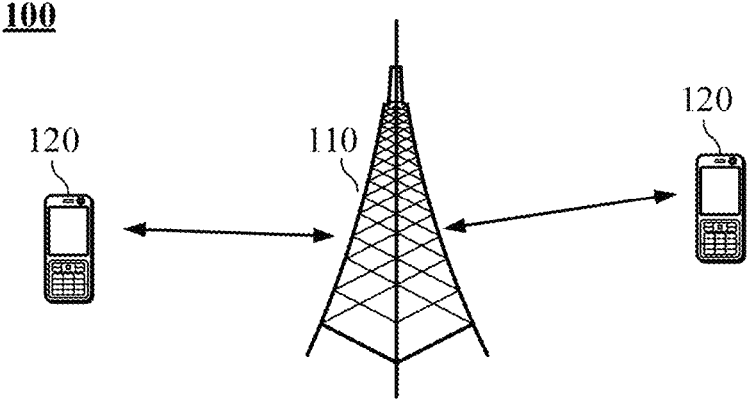

A terminal sends a first message to a network device when determining that link quality is poor enough to satisfy a first condition, and the first message is used to indicate a first signal whose signal quality is good enough to satisfy a second condition — 210

The terminal detects a second message in a first search space of a control resource set according to a first QCL hypothesis determined based on the first signal, and the second message is a response message sent by the network device for the first message — 220

The terminal stops detecting messages from the network side in the second search space of the control resource set from a first moment; wherein the first moment is a moment when the first message is sent or thereafter — 230

Fig. 2

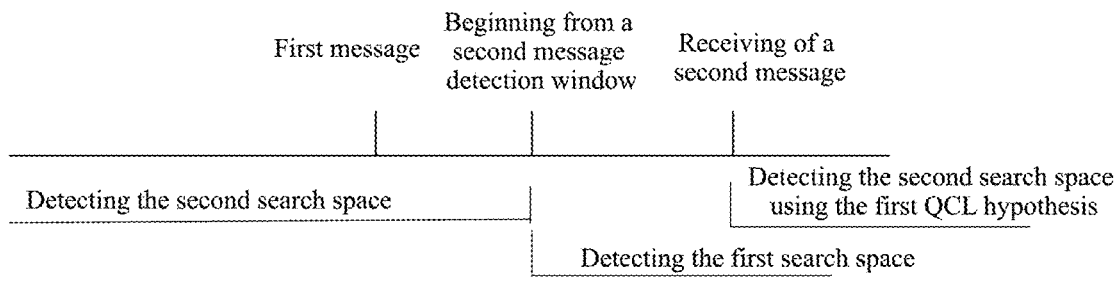

A terminal sends a first message to a network device when determining link quality is poor enough to satisfy a first condition, and the first message is used to indicate a first signal whose signal quality is good enough to satisfy a second condition — 310

The terminal detects a second message in a first search space of a control resource set according to a first QCL hypothesis determined based on the first signal, and the second message is a response message sent by the network device for the first message — 320

The terminal detects messages from the network device in the second search space of the control resource set from a first moment; wherein, the first moment is a moment when the detection of the second message begins or thereafter — 330

Fig. 7

WIRELESS COMMUNICATION METHOD AND TERMINAL FOR DETERMINING A LINK QUALITY FOR IMPROVING COVERAGE AND SPECTRAL EFFICIENCY

CROSS-REFERENCE TO RELATED APPLICATIONS

This application is a continuation of International Application No. PCT/CN2018/086188, filed on May 9, 2018, which is hereby incorporated by reference in its entirety.

TECHNICAL FIELD

The present disclosure relates to the field of communication and, more specifically, to a wireless communication method and a terminal.

BACKGROUND

In the research of the fifth generation (5G) mobile communication technology, the beamforming technology is an important technology for improving coverage and spectral efficiency. Beamforming is a signal preprocessing technology based on an antenna array, which generates directional beams by adjusting the weights of the transmitted signals on each antenna array element.

Network devices can use different beams to send multiple signals, while terminal devices can measure the received signals to determine whether the links transmitting these signals are too poor to be available or not.

If a link is too poor to be available, a signal indicating good quality of the signals can be sent to the network equipment to achieve the link reconfiguration process where how to deal with the message in the non-link reconfiguration process is not conclusive yet.

SUMMARY

Embodiments of the present disclosure provide a wireless communication method and a terminal, and provide a processing method of a message in a non-link reconfiguration process.

In a first aspect, a wireless communication method is provided, including:

sending, by a terminal, a first message to a network device when determining that link quality is poor enough to satisfy a first condition, the first message being used to indicate a first signal whose signal quality is good enough to satisfy a second condition;

detecting, by the terminal, a second message in a first search space of a control resource set according to a first quasi-co-location QCL hypothesis determined based on the first signal, the second message being a response message sent by the network device for the first message;

stopping, by the terminal, detecting messages from a network side in a second search space of the control resource set from a first moment, wherein, the first moment is a moment when the first message is sent or thereafter.

Therefore, in the embodiments of the present disclosure, the terminal sends the first message which is used to indicate the first signal whose signal quality is good enough to satisfy the second condition to the network device when determining that the link quality is poor enough to satisfy the first condition, according to the first quasi-co-location QCL hypothesis which is determined based on the first signal, the terminal detects the second message in the first search space of the control resource set, the terminal stops detecting messages from the network side in the second search space of the control resource set from the moment when the first message is sent or thereafter thus avoiding detection conflicts between the first search space and the second search space, and avoiding no receiving or receiving a wrong second message.

Combined with the first aspect, in one of the possible implementations of the first aspect, the first moment is a moment when the terminal begins to detect the second message in the first search space.

Combined with the first aspect or any one of the above possible implementations, in one of the possible implementations of the first aspect, the method further includes:

continuing to detect, by the terminal, messages from the network side in the second search space from a second moment, the second moment being a moment after the first moment.

Combined with the first aspect or any one of the above possible implementations, in one of the possible implementations of the first aspect, the second moment is a moment when the second message is detected by the terminal.

Combined with the first aspect or any one of the above possible implementations, in one of the possible implementations of the first aspect, continuing to detect, by the terminal, messages from the network side in the second search space from a second moment further including:

continuing to detect, by the terminal, the messages from the network side in the second search space based on the first QCL hypothesis from the second moment.

Combined with the first aspect or any one of the above possible implementations, in one of the possible implementations of the first aspect, a transmission beam corresponding to the first QCL hypothesis is a transmission beam of the first signal.

Combined with the first aspect or any one of the above possible implementations, in one of the possible implementations of the first aspect, a receiving beam corresponding to the first QCL hypothesis is a receiving beam corresponding to the first signal.

In a second aspect, a wireless communication method is provided, including:

sending, by a terminal, a first message to a network device when determining that link quality is poor enough to satisfy a first condition, the first message being used to indicate a first signal whose signal quality is good enough to satisfy a second condition;

detecting, by a terminal, a second message in a first search space of a control resource set according to a first quasi-co-location QCL hypothesis determined based on the first signal, the second message being a response message sent by the network device for the first message;

detecting, by a terminal, messages from a network side in a second search space of the control resource set from a first moment, wherein the first moment is a moment when detection of the second message begins or thereafter.

Therefore, in the embodiments of the present disclosure, the terminal sends the first message to the network device in case of determining that the link quality is poor enough to satisfy the first condition, the first message is used for indicating the first signal whose signal quality is good enough to satisfy the second condition, and according to the first QCL hypothesis which is determined based on the first signal, the terminal detects the second message in the first search space of the control resource set, the second message is the response message sent by the network device for the first message, and the terminal detects the message from the network side in the second search space of the control resource set at the moment when the detection of the second message begins or thereafter, thereby avoiding missing detection of the messages in the second search space.

Combined with the second aspect, in one of the possible implementations of the second aspect, the method further includes:

detecting, by a terminal, the messages from the network side in the second search space before the first moment.

Combined with the second aspect or any one of the above possible implementations, in one of the possible implementations of the second aspect, the method further includes:

detecting the messages from the network side in the second search space using a second QCL hypothesis from the first moment, wherein the second QCL hypothesis is different from the first QCL hypothesis.

Combined with the second aspect or any one of the above possible implementations, in one of the possible implementations of the second aspect, the second QCL hypothesis is a QCL hypothesis adopted on the second search space before the first message is sent.

Combined with the second aspect or any one of the above possible implementations, in one of the possible implementations of the second aspect, the method further includes:

detecting, the messages from the network side in the second search space using the first QCL hypothesis from a second moment, the second moment being a moment after the first moment.

Combined with the second aspect or any one of the above possible implementations, in one of the possible implementations of the second aspect, the method further includes:

stopping detecting, by the terminal, the messages from the network side in the second search space from a second moment, the second moment being a moment after the first moment.

Combined with the second aspect or any one of the above possible implementations, in one of the possible implementations of the second aspect, the second moment is a moment when the second message is detected by the terminal.

Combined with the second aspect or any one of the above possible implementations, in one of the possible implementations of the second aspect, the method further includes:

detecting, by the terminal, the messages from the network side in the second search space using the first QCL hypothesis from the first moment.

Combined with the second aspect or any one of the above possible implementations, in one of the possible implementations of the second aspect, the method further includes:

giving a priority to detection of the first search space, when the detection of the first search space conflicts with detection of the second search space.

Combined with the second aspect or any one of the above possible implementations, in one of the possible implementations of the second aspect, the first search space and the second search space satisfy at least one of the following conditions:

the first search space and the second search space are configured on different time slots;

the first search space and the second search space are configured on different symbols;

the first search space and the second search space do not have the same downlink control information DCI format or are configured with different DCI formats;

the first search space and the second search space do not have the same aggregation level or are configured with different aggregation levels.

Combined with the second aspect or any one of the above possible implementations, in one of the possible implementations of the second aspect, a transmission beam corresponding to the first QCL hypothesis is a transmission beam of the first signal.

Combined with the second aspect or any one of the above possible implementations, in one of the possible implementations of the second aspect, a receiving beam corresponding to the first QCL hypothesis is a receiving beam corresponding to the first signal.

In A third aspect, a terminal is provided for performing the first or second aspect or the methods in their respective implementations described above.

Specifically, the terminal includes functional modules for performing the first or second aspect or the methods in their respective implementations described above.

In a fourth aspect, a terminal is provided, including a processor and a memory. The memory is used to store computer programs, and the processor is configured to call and run the computer programs stored in the memory, to perform the first or second aspect or the methods in their respective implementations described above.

In a fifth aspect, a chip is provided for realizing any one of the first or second aspect or the methods in their respective implementations mentioned above.

Specifically, the chip includes a processor for calling computer programs from a memory and running the computer programs so that a device equipped with the chip performs, for example, any one of the first or second aspect or the methods in their respective implementations mentioned above.

In a sixth aspect, a computer readable storage medium is provided for storing computer programs that enable a computer to execute any one of the first or second aspect or the methods in their respective implementations mentioned above.

In a seventh aspect, a computer program product is provided, including computer program instructions that enable a computer to execute any one of the first or second aspect or the methods in their respective implementations mentioned above.

In an eighth aspect, a computer program is provided to enable a computer to perform any one of the first or second aspect or the methods in their respective implementations mentioned above when it runs on the computer.

BRIEF DESCRIPTION OF DRAWINGS

FIG. 1 is a schematic diagram of a wireless communication system according to an embodiment of the present disclosure;

FIG. 2 is a schematic flowchart of a wireless communication method according to an embodiment of the present disclosure;

FIG. 6 is a schematic diagram of a search space detection according to the present disclosure;

FIG. 7 is a schematic flowchart of a wireless communication method according to an embodiment of the present disclosure.

DESCRIPTION OF EMBODIMENTS

Figure 3:
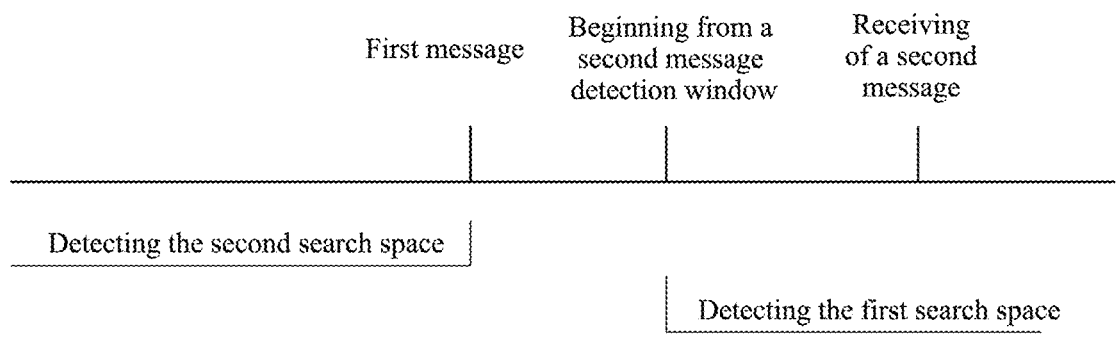
FIG. 3 is a schematic diagram of a search space detection according to the present disclosure.

The technical solutions in embodiments of the present disclosure will be described below in conjunction with the appended drawings in the embodiments of the present disclosure, and obviously, the embodiments described are a part of the embodiments of the present disclosure, rather than all embodiments of the present invention. Based on the embodiments in the present disclosure, all other embodiments obtained by peoples of ordinary skilled in the art without creative work fall within the protection scope of the present disclosure.

The technical solutions of the embodiments of the present disclosure can be applied to various communication systems, such as: Global System of Mobile Communication (GSM) system, Code Division Multiple Access (CDMA) system, Wideband Code Division Multiple Access (WCDMA) system, General Packet Radio Service (GPRS), Long Term Evolution (LTE)system, LTE Frequency Division Duplex (FDD), LTE Time Division Duplex (TDD), Universal Mobile Telecommunication Systems (UMTS), Worldwide Interoperability for Microwave Access (WiMAX) communication system or future 5G system (also called New Radio, NR) system, etc.

FIG. 1 illustrates a wireless communication system 100 applied in the embodiments of the present disclosure. The wireless communication system 100 may include a network device 110. The network device 100 may be a device that communicates with a terminal device. The network device 100 can provide a communication coverage for a specific geographical area and can communicate with the terminal device (such as a UE) located in the coverage area. In an implementation, the network device 100 can be a Base Transceiver Station (BTS) in a GSM system or a CDMA system, a NodeB (NB) in a WCDMA system, an Evolutionary Node B (eNB or eNodeB) in an LTE system, or a wireless controller in a Cloud Radio Access Network (CRAN), or a wireless controller in a Cloud Radio Access Network (CRAN), or the network device can be a relay station, an access point, a vehicle-mounted device, a wearable device, a network-side device in the future 5G network or a network device in the future evolved Public Land Mobile Network (PLMN).

The wireless communication system 100 further includes at least one terminal device 120 located within the coverage of the network device 110. The terminal device 120 may be mobile or fixed. In an implementation, the terminal device 120 may refer to an access terminal, a User Equipment (UE), a user unit, a user station, a mobile station, a mobile platform, a remote station, a remote terminal, a mobile device, a user terminal, a terminal, a wireless communication device, a user agent or user apparatus. The access terminal can be a cellular phone, a cordless phone, a Session Initiation Protocol (SIP) phone, a Wireless Local Loop (WLL) station, a Personal Digital Assistant (PDA), a handheld device with wireless communication function, a computing device or other processing device connected to a wireless modem, a vehicle-mounted device, a wearable device, a terminal device in the future 5G network, or a terminal device in the future evolved PLMN, etc.

In an implementation, device to device (D2D) communication can be performed between terminal devices 120. In an implementation, a 5G system or network can also be called a New Radio (NR) system or network.

FIG. 1 illustrates an example of a network device and two terminal devices, and in an implementation, the wireless communication system 100 may include multiple network devices and the coverage of each network device may include other number of terminal devices, which are not limited by the embodiments of the present disclosure.

In an implementation, the wireless communication system 100 may also include other network entities such as network controllers, mobile management entities, etc., which are not limited by the embodiments of the present disclosure.

It should be understood that the terms "system" and "network" herein are often used interchangeably herein. The term "and/or" in present specification only describes the relative relationship of related objects, indicating that there can be three relationships, for example, A and/or B, which can be expressed as: A exists alone, A and B exist simultaneously, and B exists alone. In addition, the character "/" herein generally indicates that the relation between the front and back objects is an "or" relationship.

FIG. 2 is a schematic flowchart of a wireless communication method 200 according to an embodiment of the present disclosure. The method 200 can in an implementation be applied to the system shown in FIG. 1, but is not limited to this. As shown in FIG. 2, the method 200 includes at least part of the following.

In 210, the terminal sends a first message to a network device when determining that link quality is poor enough to satisfy a first condition, and the first message is used to indicate a first signal whose signal quality is good enough to satisfy a second condition.

In an implementation, the first signal may be a Channel State Information Reference Signal (CSI-RS), a Synchronous Signal (SS) or a Physical Broadcasting Channel (PBCH).

In an implementation, in the embodiments of the present disclosure, the quality of the signal (such as CSI-RS, SS or PBCH, etc.) corresponding to the current link (e.g., Physical Downlink Control Channel (PDCCH) can be measured, and whether the quality of the current link is poor enough to meet certain conditions is determined through the signal quality.

Wherein, the first condition may refer to that the Hypothetical Block Error Ratio (BLER) corresponding to the current link is greater than or equal to a predetermined threshold.

In an implementation, in the embodiments of the present disclosure, it can be done that measuring the signals of signal centralization and choosing a first signal whose signal quality is better, that is, a first signal with good enough signal quality to satisfy the second condition.

Wherein, the signal quality judgment can be based on L1-Reference Signal Receiving Power (RSRP) of signals, and the first signal may be the signal whose L-RSRP is higher than the threshold value, or the signal with the highest L1-RSRP in the signal centralization.

In an implementation, each signal in the signal centralization can be transmitted respectively by different beams.

Wherein, the terminal can measure the signals of signal centralization, and when signals with good quality are found, the index of the signals can be notified to the network side, then the network side can send downlink channels or signals, such as downlink control channel (PDCCH), to the terminal using the transmitting beams sending the signals. And, the terminal device can receive the downlink channels or signals using the receiving beam corresponding to the transmitting beam.

In an implementation, in the embodiments of the present disclosure, the event that the link quality is poor enough to satisfy the first condition may be referred to as that the beam failure is happened.

In an implementation, in the embodiments of the present disclosure, the terminal may select the physical Random Access Channel (PRACH) resource corresponding to the first signal (or the transmission beam of the first signal) to initiate a transmission, or may also report the selected signal (or beam) through the Physical Uplink Control Channel (PUCCH).

In an implementation, in the embodiments of the present disclosure, the first message may be referred to as a beam failure recovery request.

In 220, the terminal detects a second message in a first search space of a control resource set according to a first quasi-co-location (QCL) hypothesis determined based on the first signal, and the second message is a response message sent by the network device for the first message.

In an implementation, in the embodiments of the present disclosure, the control resource set can be used to send a Physical Downlink Control Channel (PDCCH). The control resource set can be Control Resource Set (CORESET).

In an implementation, in the embodiments of the present disclosure, one control resource set may be configured with multiple search spaces (for example, search space(SS)).

Wherein, the multiple search spaces may include a search space dedicated to detecting the second message and a search space for detecting other messages.

Wherein, the first search space can be called Search Space-Beam Failure Recovery (SS-BFR).

For a clearer understanding of the present disclosure, the control resource set will be described below.

For each Downlink Band Width Part (DLBWP) configured for a terminal of a serving cell, a certain number (e.g., less than or equal to three) of control resource sets can be configured for the terminal through a higher-layer signaling. For each control resource set, the terminal is configured through higher-layer parameters as follows:

1) The index of the control resource set is p, wherein, in an implementation, $0 \le p < 12$;

2) Demodulation reference signal (DMRS) scrambling sequence initialization value;

3) The granularity of the precoder for multiple Resource Element Group (REG) in frequency domain, wherein, the terminal can assume that the same precoder is used;

4) Multiple consecutive symbols;

5) Resource block set;

6) Mapping parameters of Control Channel Element (CCE) to REG;

7) An antenna port quasi-co-location, which indicates quasi-co-location information of the DMRS antenna port for PDCCH reception;

8) Indications that indicates whether the transmission configuration indication (TCI) domain for DCI format 1_0 or 1_1 exists and is sent by a PDCCH in control resource set p.

The search space will be described below.

For each Downlink Band Width Part (DLBWP) configured for a terminal of a serving cell, a certain number (e.g., less than or equal to 10) of search spaces can be configured for the terminal through a higher-layer signaling, and for each search space, the terminal is configured through higher-layer parameters as follows:

1) index s of the search space, in an implementation, $0 \le s < 40$;

2) The association between the control resource set p and the search space s.

3) Monitoring period of the PDCCH and monitoring offset of the PDCCH;

4) Monitoring pattern of the PDCCH in a time slot;

5) Multiple PDCCH candidates, for each CCE aggregation level L31;

6) Indicating that the search space is either a public search space or a UE-specific search space; and that each search space is used to monitor PDCCH candidates for which DCI format.

It should be understood that only one implementation of the control resource set and the search space is described above, and other deformed control resource sets and search spaces can be obtained based on the above implementation. For example, multiple options of the above configuration can be partially chosen or can be deformed to some extent.

In an implementation, in the embodiments of the present disclosure, the terminal may determine the first QCL hypothesis based on the first signal and receive the second message based on the first QCL hypothesis.

Specifically, the transmission beam corresponding to the first QCL hypothesis is the transmission beam of the first signal. Furthermore, the receiving beam corresponding to the first QCL hypothesis is the receiving beam corresponding to the first signal.

In an implementation, in the embodiments of the present disclosure, the processes mentioned in 210 and 220 may be referred to as link reconfiguration procedures, or beam failure recovery procedures.

In an implementation, in the embodiments of the present disclosure, the second message may be used to indicate agreement to receive the PDCCH using the first QCL corresponding to the first signal.

In an implementation, in the embodiments of the present disclosure, the second message may be referred to as a valid response.

In an implementation, in the embodiments of the present disclosure, there may exist an overlap between the first search space and a second search space, for example, the same time-frequency resources, the same Downlink Control Information (DCI) format or the same aggregation level may exist.

In 230, the terminal stops detecting messages from the network side in the second search space of the control resource set from a first moment, wherein the first moment is a moment when the first message is sent or thereafter.

In an implementation, in the embodiments of the present disclosure, the terminal stops detecting messages from the network side (e.g., the network device mentioned in the embodiments of the present disclosure) in the second search space of the control resource set from the first moment, meaning that the detection of the second search space is not performed for a period of time from the first moment.

Wherein, the second search space can be detected at the time before the first moment, for example, as shown in FIG. 3, the second search space is detected before the first message, and after the first message is sent, the detection of the second search space is stopped and the detection of the first search space begins from a second message detection window.

Of course, the second search space may not be detected before the first moment.

In an implementation, in the embodiments of the present disclosure, the first moment may be the moment when the terminal begins to detect the second message in the first search space.

Figure 4:
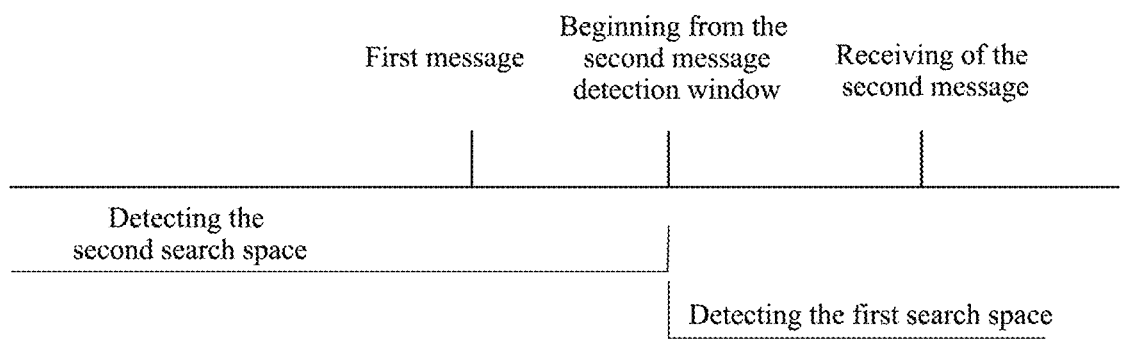
FIG. 4 is a schematic diagram of a search space detection according to the present disclosure.

For example, as shown in FIG. 4, the second search space is detected before the beginning of the second message detection window, and the detection of the second search space is stopped after the beginning of the second message detection window, and the first search space is detected after the beginning of the second message detection window.

In an implementation, in the embodiments of the present disclosure, the terminal continues to detect the messages from the network side in the second search space from the second moment which is a moment after the first moment.

Specifically, the terminal does not detect the second search space for a period of time beginning from the first moment, and begins the detection of the second search space at a certain moment after the first moment.

In an implementation, in the embodiments of the present disclosure, the second moment is a moment when the second message is detected by the terminal.

In an implementation, in the embodiments of the present disclosure, the terminal continues to detect messages from the network side in the second search space based on the first QCL hypothesis from the second moment.

That is to say, the terminal can receive signals in the second search space using the receiving beam corresponding to the first signal.

Figure 5:
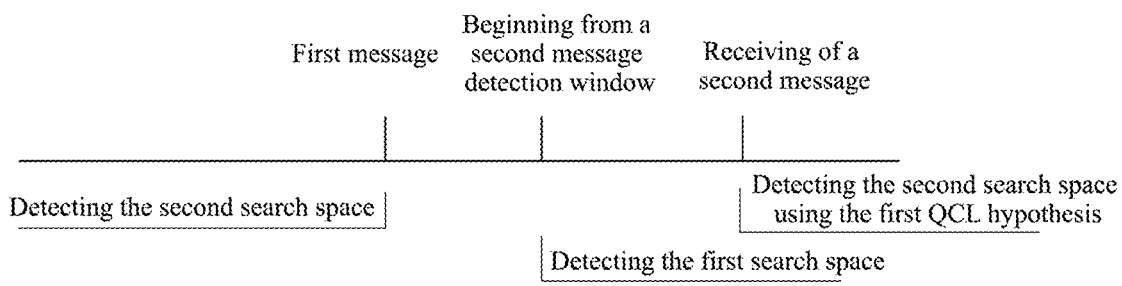
FIG. 5 is a schematic diagram of a search space detection according to the present disclosure.

For example, as shown in FIG. 5, the second search space is detected before the first message is sent, the detection of the second search space is stopped after the first message is sent, the first search space is detected from the second message detection window, and the second search space is continued to be detected using the first QCL hypothesis when the second message is received by the terminal.

For example, as shown in FIG. 6, the second search space is detected before the beginning of the second message detection window, the detection of the second search space is stopped after the beginning of the second message detection window, the first search space is detected after the beginning of the second message detection window, and the second search space is continued to be detected using the first QCL hypothesis when the second message is received by the terminal.

However, the embodiments of the present disclosure are not limited to these, for example, the second moment may be a moment having a predetermined time interval from the first moment. Alternatively, it may be a moment after the moment when the second message is detected, for example, a moment having a predetermined time interval from the moment when the second message is detected.

In an implementation, in the embodiments of the present disclosure, the second message may reconfigure the QCL hypothesis, for example, it may be another QCL hypothesis, then the detection of the first search space and/or the second search space can be performed using the another QCL hypothesis after the second message is received.

Therefore, in the embodiments of the present disclosure, the terminal sends a first message to the network device when determining that the link quality is poor enough to satisfy the first condition, where the first message is used for indicating the first signal whose signal quality is good enough to satisfy the second condition, and the terminal detects the second message in the first search space of the control resource set according to the first QCL hypothesis which is determined based on the first signal, and the terminal stops detecting messages from the network side in the second search space of the control resource set at the moment when the first message is sent or thereafter, thus avoiding detection conflicts between the first search space and the second search space, and avoiding receiving nothing or receiving the wrong second message.

FIG. 7 is a schematic flowchart of a wireless communication method 300 according to an embodiment of the present disclosure. As shown in FIG. 7, the method 300 can in an implementation be applied to the system shown in FIG. 1, but is not limited thereto.

It should be understood that some implementations or explanations in method 200 can be used in method 300, for example, explanations about control resource set and search space, and implementations of first message sending and second message receiving, etc. which for the sake of brevity will not be repeated here.

As shown in FIG. 7, the method 300 includes at least some of the following.

In 310, a terminal sends a first message to a network device when determining that link quality is poor enough to satisfy a first condition, and the first message is used to indicate a first signal whose signal quality is good enough to satisfy a second condition.

In 320, the terminal detects a second message in a first search space of a control resource set according to a first quasi-co-location QCL hypothesis determined based on the first signal, and the second message is a response message sent by the network device for the first message.

In 330, the terminal detects messages from the network side in the second search space of the control resource set from a first moment, wherein the first moment is a moment when the detection of the second message begins or thereafter.

In an implementation, in the embodiments of the present disclosure, the second search space will be detected from the first moment until a predetermined condition is satisfied, for example, the detection of the second search space will stop at a specific moment, or the search space is detected for a specific duration.

In an implementation, in the embodiments of the present disclosure, the terminal detects the messages from the network side in the second search space before the first moment.

Of course, the terminal can also do not detect the messages from the network side in the second search space before the first moment.

In an implementation, in the embodiments of the present disclosure, the second QCL hypothesis is used to detect the messages from the network side in the second search space from the first moment, and wherein the second QCL hypothesis is different from the first QCL hypothesis.

In an implementation, before the first moment, the terminal can detect the second search space using the second QCL hypothesis.

Wherein, the second QCL hypothesis is a QCL hypothesis adopted on the second search space before the first message is sent.

In an implementation, in the embodiments of the present disclosure, for the case that the terminal performs the detection of the second search space using the second QCL hypothesis from the first moment, the messages from the network side may be detected in the second search space using the first QCL hypothesis from the second moment which is a moment after the first moment.

Figure 8:
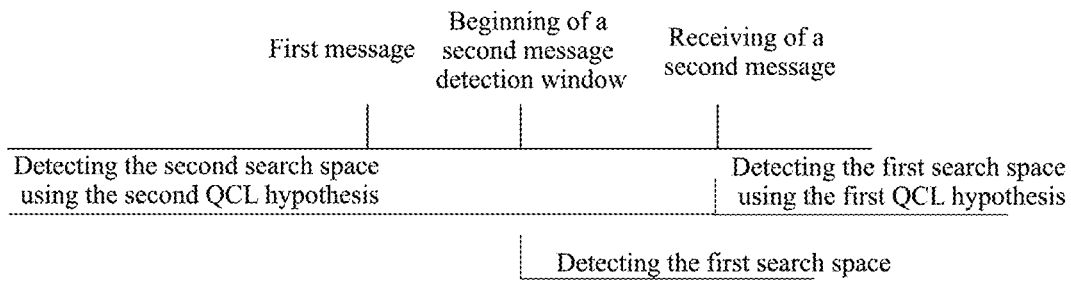
FIG. 8 is a schematic diagram of a search space detection according to an embodiment of the present disclosure.

For example, as shown in FIG. 8, the terminal detects the second search space using the second QCI hypothesis before detecting the beginning of the second message detection window, and detects the second search space using the first QCL hypothesis after receiving the second message, and wherein the first search space is detected at the beginning of the second message detection window.

Alternatively, in the embodiments of the present disclosure, in the case that the terminal performs the detection of the second search space using the second QCL hypothesis from the first moment, the terminal stops detecting messages from the network side in the second search space from the second moment which is a moment after the first moment.

Figure 9:
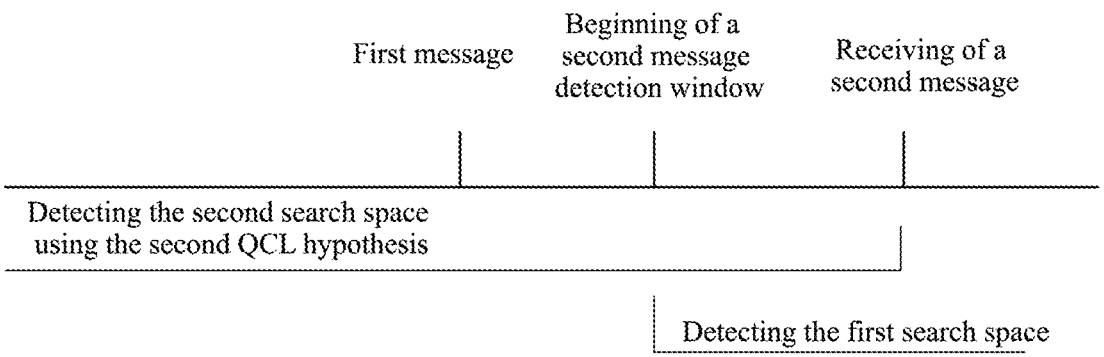
FIG. 9 is a schematic diagram of a search space detection according to an embodiment of the present disclosure.

For example, as shown in FIG. 9, the terminal detects the second search space using the second QCL hypothesis before detecting the second message, and stops detecting the second search space after detecting the second message, wherein the detection of the first search space begins at the beginning of the second message detection window.

In an implementation, in the embodiments of the present disclosure, the second moment is a moment when the second message is detected by the terminal.

In an implementation, in the embodiments of the present disclosure, the second message may reconfigure the QCL hypothesis, for example, being a third QCL hypothesis, which can be used to detect the first search space and/or the second search space after the second message is received.

However, the embodiments of the present disclosure are not limited to these, for example, the second moment may be a moment having a predetermined time interval from the first moment. Alternatively, it may be a moment after the moment when the second message is detected, for example, a moment having a predetermined time interval from the moment when the second message is detected.

In an implementation, in the embodiments of the present disclosure, the terminal may also detect messages from the network side in the second search space using the first QCL hypothesis from the first moment.

Figure 10:
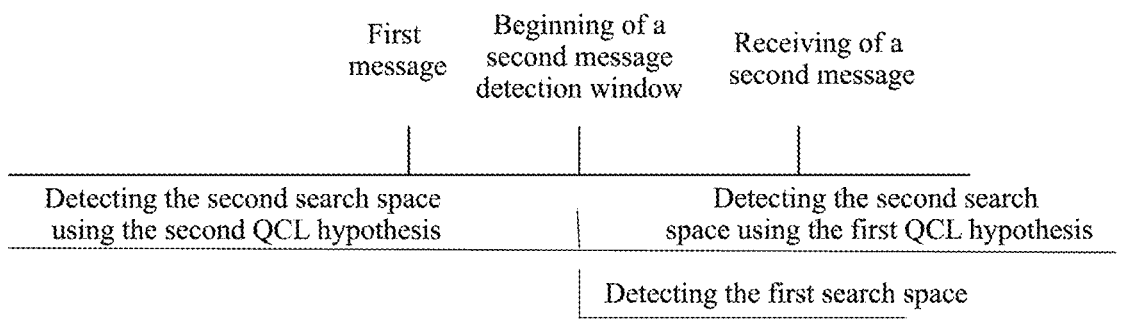
FIG. 10 is a schematic diagram of a search space detection according to an embodiment of the present disclosure.

For example, as shown in FIG. 10, the terminal detects the second search space using the second QCI hypothesis before the beginning of the second message detection window, and detects the second search space always using the first QCL hypothesis after the beginning of the second message detection window, wherein the first search space is detected at the beginning of the second message detection window.

In an implementation, in the embodiments of the present disclosure, in the case that the terminal detects the second search space using the first QCL hypothesis from the first moment, the detection of the second search space may be performed using other QCL hypothesis at the second moment mentioned above, for example, the QCL hypothesis indicated by the information carried in the second message, or the detection of the second search space may be stopped, or the detection of the second search space continues using the first QCL.

In an implementation, in the embodiments of the present disclosure, when detection on the first search space conflicts with detection on the second search space, the detection of the first search space is given a priority.

In an implementation, in the embodiments of the present disclosure, the first search space and the second search space satisfy at least one of the following conditions:

The first search space and the second search space are configured on different time slots;

The first search space and the second search space are configured on different symbols;

The first search space does not have the same downlink control information DCI format as the second search space or is configured with a different DCI format from the second search space;

The first search space does not have the same aggregation level as the second search space or is configured with a different aggregation level from the second search space.

In an implementation, in the embodiments of the present disclosure, the first search space and the second search space can be configured with multiple DCI formats respectively, and then the network side can select different DCI formats to transmit downlink channels in the first search space and the second search space respectively for the first search space and the second search space.

In an implementation, in the embodiments of the present disclosure, the first search space and the second search space can be configured with multiple aggregation levels respectively, and then the network side can select different aggregation levels to transmit downlink channels in the first search space and the second search space respectively for the first search space and the second search space.

Therefore, in the embodiments of the present disclosure, the terminal sends a first message to the network device when it determines that the link quality is poor enough to satisfy the first condition, the first message being used to indicate the first signal whose signal quality is good enough to satisfy the second condition, and the terminal detects the second message in the first search space of the control resource set according to the first QCL hypothesis determined based on the first signal, the second message being the response message sent by the network device for the first message, and the terminal detects the messages from the network side in the second search space of the control resource set at the moment when the detection of the second message begins or thereafter, thereby avoiding missing detection of the messages in the second search space.

Figure 11:
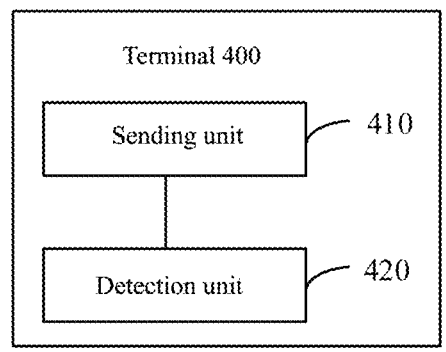
FIG. 11 is a schematic block diagram of a terminal according to an embodiment of the present disclosure.

FIG. 11 is a schematic block diagram of a terminal 400 according to an embodiment of the present disclosure. The terminal 400 includes a sending unit 410 and a detection unit 420.

In an implementation, in the embodiments of the present disclosure, the sending unit 410 is configured to send a first message to a network device when determining that link quality is poor enough to satisfy a first condition, and the first message is used to indicate a first signal whose signal quality is good enough to satisfy a second condition.

The detection unit 420 is configured to detect a second message in a first search space of a control resource set according to a first quasi-co-location QCL hypothesis determined based on the first signal, and the second message is a response message sent by the network device for the first message, and, Detecting messages from the network side in the second search space of the control resource set is stopped from the first moment, wherein the first moment is a moment when the first message is sent or thereafter.

In an implementation, in the embodiments of the present disclosure, the first moment is a moment when the detection unit 420 begins to detect the second message in the first search space.

In an implementation, in the embodiments of the present disclosure, the detection unit 420 is further configured to:

Continue to detect the messages from the network side in the second search space from the second moment which is a moment after the first moment.

In an implementation, in the embodiments of the present disclosure, the second moment is a moment when the second message is detected by the detection unit 420.

In an implementation, in the embodiments of the present disclosure, the detection unit 420 is further configured to:

Continue to detect messages from the network side in the second search space based on the first QCL hypothesis from the second moment.

In an implementation, in the embodiments of the present disclosure, the transmission beam corresponding to the first QCL hypothesis is the transmission beam of the first signal.

In an implementation, in the embodiments of the present disclosure, the receiving beam corresponding to the first QCL hypothesis is the receiving beam corresponding to the first signal.

It should be understood that the terminal 400 can correspond to the terminal in method 200 and can realize the operation realized by the terminal in method 200, which for the sake of simplicity will not be repeated here.

In an implementation, in the embodiments of the present disclosure, the sending unit 410 is configured to send a first message to a network device when determining that the link quality is poor enough to satisfy the first condition, and the first message is used to indicate the first signal whose signal quality is good enough to satisfy the second condition.

The detection unit 420 is configured to detect a second message in the first search space of the control resource set according to the first quasi-co-location QCL hypothesis determined based on the first signal, and the second message is a response message sent by the network device for the first message, and, Messages from the network side are detected in the second search space of the control resource set from a first moment, wherein the first moment is a moment when the detection of the second message begins or thereafter.

In an implementation, in the embodiments of the present disclosure, the detection unit 420 is further configured to:

Detect the messages from the network side in the second search space before the first moment.

In an implementation, in the embodiments of the present disclosure, the detection unit 420 is further configured to:

Detect messages from the network side in the second search space using the second QCL hypothesis from the first moment, wherein the second QCL hypothesis is different from the first QCL hypothesis.

In an implementation, in the embodiments of the present disclosure, the second QCL hypothesis is the QCL hypothesis adopted on the second search space before the first message is sent.

In an implementation, in the embodiments of the present disclosure, the detection unit 420 is further configured to:

Detect messages from the network side in the second search space using the first QCL hypothesis from the second moment, and the second moment is a moment after the first moment.

In an implementation, in the embodiments of the present disclosure, the detection unit 420 is further configured to:

Stop detecting messages from the network side in the second search space from the second moment, and the second moment is a moment after the first moment.

In an implementation, in the embodiments of the present disclosure, the second moment is a moment when the second message is detected by the detection unit 420.

In an implementation, in the embodiments of the present disclosure, the detection unit 420 is further configured to:

Detect the message from the network side in the second search space using the first QCL hypothesis from the first moment.

In an implementation, in the embodiments of the present disclosure, the detection unit 420 is further configured to:

When the detection in the first search space conflicts with the detection in the second search space, give a priority to the detection of the first search space.

In an implementation, in the embodiments of the present disclosure, the first search space and the second search space satisfy at least one of the following conditions:

The first search space and the second search space are configured on different time slots;

The first search space and the second search space are configured on different symbols;

The first search space does not have the same downlink control information DCI format as the second search space or is configured with a different DCI format from the second search space;

The first search space does not have the same aggregation level as the second search space or is configured with a different aggregation level from the second search space.

In an implementation, in the embodiments of the present disclosure, the transmission beam corresponding to the first QCL hypothesis is the transmission beam of the first signal.

In an implementation, in the embodiments of the present disclosure, the receiving beam corresponding to the first QCL hypothesis is the receiving beam corresponding to the first signal.

It should be understood that the terminal 400 can correspond to the terminal in method 300 and can realize the operation realized by the terminal in method 300, which for the sake of simplicity will not be repeated here.

Figure 12:
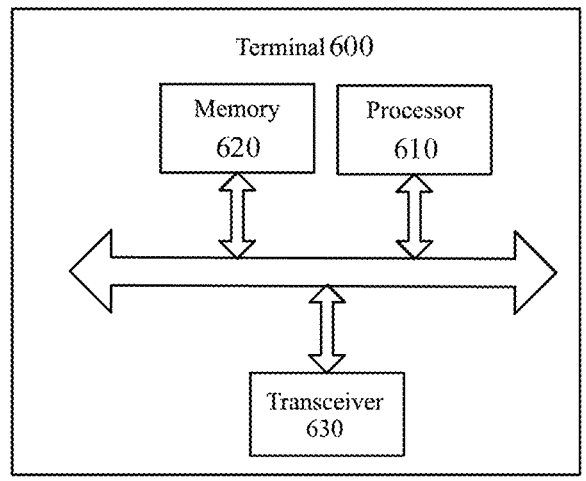
FIG. 12 is a schematic block diagram of a terminal according to an embodiment of the present disclosure.

FIG. 12 is a schematic block diagram of a terminal 600 of an embodiment of the present disclosure. The terminal 600 shown in FIG. 12 includes a processor 610, which can call a computer program from a memory and run the computer program to implement the methods in the embodiments of the present disclosure.

In an implementation, as shown in FIG. 12, the terminal 600 may also include a memory 620. Wherein the processor 610 can call a computer program from the memory 620 and run the computer program to implement the methods in the embodiments of the present disclosure.

Wherein, the memory 620 may be a separate device independent of the processor 610, and may also be integrated into the processor 610.

In an implementation, as shown in FIG. 12, the terminal 600 may further include a transceiver 630, which can be controlled by the processor 610 to communicate with other devices, specifically, to send information or data to other devices or to receive information or data sent by other devices.

Wherein the transceiver 630 may include a transmitter and a receiver. The transceiver 630 may further include an antenna, of which the number may be one or more.

In an implementation, the terminal 600 can implement the corresponding flow implemented by the terminal in each method of the embodiments of the present disclosure, which for brevity will not be repeated here.

Figure 13:
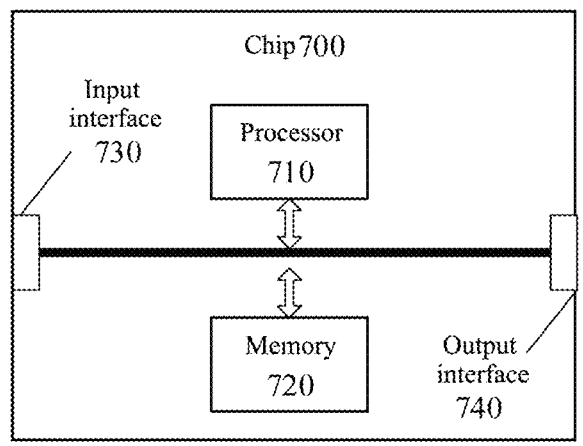
FIG. 13 is a schematic block diagram of a chip according to an embodiment of the present disclosure.

FIG. 13 is a schematic block diagram of a chip 700 according to an embodiment of the present disclosure. The chip 700 shown in FIG. 13 includes a processor 710, which can call a computer program from a memory and run the computer program to implement the methods in the embodiments of the present disclosure.

In an implementation, as shown in FIG. 13, the chip 700 may also include a memory 720. Wherein the processor 710 can call a computer program from the memory 720 and run the computer program to implement the methods in the embodiments of the present disclosure.

Wherein, the memory 720 may be a separate device independent of the processor 710, and may be also integrated into the processor 710.

In an implementation, the chip 700 may further include an input interface 730. Wherein the processor 710 can control the input interface 730 to communicate with other devices or chips, specifically, to obtain information or data sent by other devices or chips.

In an implementation, the chip 700 may further include an output interface 740. Wherein the processor 710 can control the output interface 740 to communicate with other devices or chips, specifically, to output information or data to other devices or chips.

In an implementation, the chip may be applied to the terminal in the embodiments of the present disclosure, and the chip can realize the corresponding flow realized by the terminal in each method of the embodiments of the present disclosure, which for the sake of brevity will not be repeated here.

It should be understood that the chips mentioned in the embodiments of the present disclosure may also be referred to as system-level chips, system chips, chip systems or on-chip system chips, etc.

The processor mentioned above may be a general purpose processor, a digital signal processor (DSP), a field programmable gate array (FPGA), an application specific integrated circuit (ASIC) or other programmable logic device, a transistor logic device, a discrete hardware component, etc. Wherein, the general purpose processor mentioned above may be a microprocessor or any conventional processor, etc.

The memory mentioned above may be a volatile memory or non-volatile memory, or may include both volatile and non-volatile memories. Wherein, the non-volatile memory can be a read-only memory (ROM), a programmable ROM (PROM), an erasable PROM
(EPROM), an electrically erasable EPROM (EEPROM) or a Flash memory. The volatile memory may be a random access memory (RAM).

It should be understood that the memory described above is illustrative but not restrictive, for example, the memory in the embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), an synchronized link DRAM (SLDRAM) and a Direct Rambus RAM (DR RAM) and so on. That is to say, the memory in the embodiments of the present disclosure is intended to include, but not limited to, these and memories of any other suitable type.

A person ordinary skilled in the art may realize that the units and algorithm steps of the examples described in the embodiments disclosed herein can be implemented by electronic hardware or the combination of computer software and electronic hardware. Whether these functions are implemented by a way of hardware or software depends on the specific application and design constraints of technical solutions. The technical professionals may use different method to implement the described functions for each specific application, but such implementation should not be considered beyond the scope of present disclosure.

A person skilled in the field may clearly understand that for the sake of convenience and simplicity of description, the specific working processes of the systems, devices and units described above may refer to the corresponding processes in the embodiments of the method described above, and will not be repeated here.

In several embodiments provided in the present disclosure, it should be understood that the systems, devices and methods disclosed may be implemented in other ways. For example, the embodiments of the devices described above are merely illustrative, for example, the division of the units described above is only a logical functional division, and there may be other ways of division when implemented in practice, such as multiple units or components can be combined or integrated into another system, or some features can be ignored, or not implemented. In addition, the mutual coupling or direct coupling or communication connection shown or discussed may be indirect coupling or communication connection through some interfaces, devices or units, and may be electrical, mechanical or other forms.

The unit described as a separate component may or may not be physically separated, and the components shown as a unit may or may not be a physical unit, that is, they may be located in one place or may be distributed over multiple network units. Some or all of the units can be selected according to actual needs to achieve the purpose of the present embodiment solutions.

In addition, the functional units in the various embodiments of the present disclosure may be integrated into one processing unit, or each unit may exist physically separately, or two or more units may be integrated into one unit.

If the functions are implemented in the form of software function units and sold or used as independent products, they can be stored in a computer-readable storage medium. Based on such understanding, an essential part of the technical solution of the present disclosure, or a part that contributes to the prior art, or a part of the technical solution, may be embodied in the form of a software product, the computer software product being stored in a storage medium, including several instructions that are used to cause a computer device (which may be a personal computer, server, or network device, etc.) to perform all or part of the steps of the methods described in various embodiments of the present disclosure. The foregoing storage medium includes: a U disk, a mobile hard disk, a read-only memory (ROM), a random access memory (RAM), a magnetic disk, or an optical disk, and the like, which can store program codes.

What above mentioned are only the specific implementations of the present disclosure, but the protection scope of the present disclosure is not limited to this, and any changes or substitutions that any skilled person familiar with the present technical field can easily think of within the scope of the technology disclosed in the present disclosure should all be covered in the protection scope of the present disclosure. Therefore, the protection scope of the present disclosure shall be subject to the protection scope of the claims.

What is claimed is:

1. A terminal, comprising: a processor, a memory and a transceiver, wherein the memory is used for storing computer programs and the processor is configured to call and run the computer programs, which, when executed by the processor, cause the processor to:
    control the transceiver to send a first message to a network device when determining that link quality is poor enough to satisfy a first condition, and the first message is used to indicate a first signal whose signal quality is good enough to satisfy a second condition;
    detect a second message in a first search space of a control resource set according to a first quasi-co-location (QCL) hypothesis determined based on the first signal, and the second message is a response message sent by the network device for the first message;

stop detecting messages from a network side in a second search space of the control resource set from a first moment; wherein the first moment is a moment when the first message is sent or thereafter; and continue to detect messages from the network side in the second search space from a second moment, and the second moment is a moment after the first moment.

2. The terminal according to claim 1, wherein the first moment is a moment when beginning to detect the second message in the first search space.

3. The terminal according to claim 1, wherein the second moment is a moment when the second message is detected.

4. The terminal according to claim 1, wherein the processor is further configured to:

continue to detect messages from the network side in the second search space based on the first QCL hypothesis from the second moment.

5. The terminal according to claim 1, wherein a transmission beam corresponding to the first QCL hypothesis is a transmission beam of the first signal.

6. The terminal according to claim 1, wherein a receiving beam corresponding to the first QCL hypothesis is a receiving beam corresponding to the first signal.

7. A non-transitory computer readable storage medium, for storing computer programs that enable a computer to execute operations, comprising:

sending a first message to a network device when determining that link quality is poor enough to satisfy a first condition, the first message being used to indicate a first signal whose signal quality is good enough to satisfy a second condition;

detecting a second message in a first search space of a control resource set according to a first quasi-co-location QCL hypothesis determined based on the first signal, the second message being a response message sent by the network device for the first message;

stopping detecting messages from a network side in a second search space of the control resource set from a first moment, wherein, the first moment is a moment when the first message is sent or thereafter; and continuing to detect messages from the network side in the second search space from a second moment, and the second moment is a moment after the first moment.

8. The terminal according to claim 1, wherein the second moment is a moment after the moment when the second message is detected.

9. The terminal according to claim 1, wherein the first signal comprises a signal with the highest reference signal receiving power (RSRP) in signal centralization.

10. The terminal according to claim 1, wherein the processor is further configured to:

receive a downlink channel or a signal which is transmitted by the network device to the terminal using a transmission beam of the first signal.

11. The terminal according to claim 1, wherein the first message is a beam failure recovery request.

12. The terminal according to claim 1, wherein the control resource set is used to send a physical downlink control channel (PDCCH).

13. The terminal according to claim 1, for the control resource set, the terminal is configured with at least one of following higher-layer parameters:

an index of the control resource set; an demodulation reference signal (DMRS) scrambling sequence initialization value;

granularity of a precoder for multiple resource element groups (REG) in frequency domain; and multiple consecutive symbols; a mapping parameter of a control channel element (CCE) and an REG.

14. The terminal according to claim 1, for a respective search space of the control resource set, the terminal is configured with at least one of following higher-layer parameters:

an index of the respective search space;

association between an index of the control resource set and the index of the respective search space;

a monitoring period of a PDCCH and a monitoring offset of the PDCCH;

a monitoring pattern of a PDCCH in a time slot;

multiple PDCCH candidates for each CCE aggregation level;

search space indication information which is used to indicate that the respective search space is either a common search space or a user equipment (UE) specific search space.

* * * * *